United States Patent
Raetzsch et al.

(10) Patent No.: US 6,310,140 B1
(45) Date of Patent: Oct. 30, 2001

(54) THERMOPLASTIC ELASTOMERS OF GOOD DYEABILITY AND HIGH STRENGTH AND ELASTICITY AS WELL AS IMPACT-RESISTANT POLYMER BLENDS PRODUCED THEREFROM

(75) Inventors: Manfred Raetzsch, Kirchschlag; Norbert Reichelt, Neuhofen; Achim Hesse, Linz; Hartmut Bucka, Eggendorf, all of (AT); Matthias Stolp, Merseburg; Hans-Joachim Radusch, Weissenfels, both of (DE)

(73) Assignee: Borealis GmbH, Schwechat-Mannswoerth (AT)

( * ) Notice: Subject to any disclaimer, the term of this patent is extended or adjusted under 35 U.S.C. 154(b) by 0 days.

(21) Appl. No.: 09/229,416

(22) Filed: Apr. 19, 1999

(30) Foreign Application Priority Data

Jan. 19, 1998 (DE) .............................. 198 01 687

(51) Int. Cl.⁷ .............................. C08F 8/00; C08L 23/00; C08L 23/04
(52) U.S. Cl. ........................... 525/191; 525/193; 525/240
(58) Field of Search ................................. 525/191, 193, 525/240

(56) References Cited

U.S. PATENT DOCUMENTS 5,292,811 * 3/1994 Murata et al. ..................... 525/193
5,861,463 * 1/1999 Sehanobish et al. ............... 525/240

* cited by examiner

Primary Examiner—Nathan M. Nutter
(74) Attorney, Agent, or Firm—Jordan and Hamburg LLP

(57) ABSTRACT

Thermoplastic elastomers of good dyeability and high strength and elasticity, the incorporated elastomeric particles of which have and average particle diameter of 0.05 to 5 $\mu$m. The thermoplastic elastomers are formed according to a method in which mixtures of propylene homopolymers and/or propylene copolymers, elastomeric $C_4$ $C_{12}$ olefin copolymers and/or terpolymers and $C_8$ to $C_{14}$ diacrylates, $C_7$ to $C_{16}$ diallyl compounds, $C_9$ to $C_{15}$ dimethacrylates, $C_7$ to $C_{10}$ divinyl compounds, $C_{12}$ to $C_{17}$ acrylate esters of polyalcohols, $C_{15}$ to $C_{21}$ methacrylate esters of polyalcohols and/or $C_9$ $C_{12}$ triallyl compounds are added to a melt. The thermoplastic elastomers, as well as mixtures of the thermoplastic elastomers with conventional polyolefins, are suitable for use in the vehicle industry, in the domestic appliances industry, in the construction industry and in medical technology.

13 Claims, No Drawings

THERMOPLASTIC ELASTOMERS OF GOOD DYEABILITY AND HIGH STRENGTH AND ELASTICITY AS WELL AS IMPACT-RESISTANT POLYMER BLENDS PRODUCED THEREFROM

BACKGROUND OF THE INVENTION

The invention relates to thermoplastic elastomers of good dyeability and high strength and elasticity, as well as to high impact-resistant polymer blends produced therefrom, which are suitable for use in the motor vehicle industry, in the domestic appliances industry and in medical technology. The invention also relates to a method for the production of these thermoplastic elastomers.

Thermoplastic elastomers, such as styrene-butadiene block copolymers, thermoplastic polyurethanes, polyester amides, polyether amides, thermoplastic copolyester elastomers and polyolefin alloys with elastomers, are known (Rader, C., Kunststoffe 83 (1993) 10, 777–781, Kunststoffe 86, (1996) 12, 1845–1851).

The special advantage of polyolefin alloys with thermoplastic elastomers lies in that they can be processed easily and recycled advantageously.

The material properties of thermoplastic elastomers based on polyolefin alloys with elastomers, such as the strength and elasticity, are determined by the composition of the polyolefin components and of the elastomeric components and by the distribution of the elastomeric components in the polyolefin component (Moore, P., Polypropylene Handbook, Carl Hanser-Verlag Munich 1996, 218–225).

Known elastomeric components for thermoplastic elastomers based on polypropylene are ethylene-propylene elastomers (EP 672 712; EP 614940), ethylene-propylene-diene elastomers (EP 547 843; EP 409542), ethylene-vinyl acetate copolymers (BE 899507; Coran, A., Rubber Chem. Technol. 54 (1981),892), chlorosulfonated polyethylene (U.S. Pat. No. 4,141,878), elastomeric copolymers of ethylene and $C_4$–$C_8$ olefins, such as elastomeric ethylene-butene copolymers (Kautschuk-Gummi-Kunststoffe 49 (1996) 12, 812–813), ethylene-hexene copolymers or ethylene-octene copolymers (Yu, T., J. Plastic Film & Sheeting 10 (1994) 1,539–564), as well as elastomeric, atactic polypropylenes (EP 334 829) in amounts of 35 to 70% by weight, based on the polyolefin mixture.

Furthermore, the vulcanization of elastomeric components in polyolefin alloys based on polypropylene/ethylene-propylene-diene elastomers, by additives such as dodecyl mercaptan (DE 26 20 820), sulfur (EP 336780) or tetrabutylthiuram disulfide (EP 376 213) is known. However, these formulations have the disadvantage of a strong discoloration, so that semi-finished products and molded objects of these materials can be used only when dyed black.

Thermoplastic elastomers based on polypropylenes and elastomeric $C_4$ to $C_8$ olefins have an outstanding dyeability, but a strength level which is significantly lower than that of thermoplastic elastomers based on polypropylenes and vulcanized ethylene-propylene-diene elastomers.

For the formulation of polypropylenes and elastomeric ethylenehexene copolymers, it is known that blends may be modified by electron irradiation (JP 96 301 927).

It is also known that the impact resistance of polypropylenes can be modified by the addition of 10–35% of amorphous ethylene-propylene-diene elastomers (Michaeli, W., Kunststoffberater (1990) 3, 38–43; Kloos, F., Angewandte Makromolekulare Chemie 185/186 (1991), 97–108), ethylene-propylene elastomers (Kim, B., J. Applied Polymer Sci. 60 (1996), 2207–2218, J. Applied Polymer Sci. 60 (1996), 1391–1403), as can reactor blends of polypropylene and ethylene-propylene rubber (Kresge, E., Macromol. Symp. 53 (1992), 173–189, Schwager, H., Kunststoffe 82 (1992) 6, 499–501), ethylene-butene elastomers (Yu, C., SPE-ANTEC '94,2439–2442; SPEANTEC '96, 1995–2000), ethylene-hexene copolymers (Japanese patent 08301 927, Yamaguchi, M., J. Appl. Polymer Sci. 63 (1997), 467–474) and ethylene-octene elastomers (EP 0 769 525, Japanese patent 97 48 920).

SUMMARY OF THE INVENTION

It is an object of the present invention to develop thermoplastic elastomers, which have good dyeability and, at the same time, a high strength and elasticity, as well as to develop high impact-resistant polymer blends produced therefrom.

Surprisingly, it was found that, by compounding propylene homopolymers and/or propylene copolymers with elastomeric $C_4$ to $C_{12}$ olefin copolymers and/or terpolymers and $C_8$ to $C_{14}$ diacrylates, $C_7$ to $C_{16}$ diallyl compounds, $C_9$ to $C_{15}$ dimethacrylates, $C_7$ to $C_{10}$ divinyl compounds, $C_{12}$ to $C_{17}$ acrylate esters of polyalcohols, $C_{15}$ to $C_{21}$ methacrylate esters of polyalcohols and/or $C_9$ to $C_{12}$ triallyl compounds as unsaturated monomers, optionally in the presence of thermally decomposing free radical-forming agents, thermoplastic elastomers are formed, which have a very finely dispersed distribution of the elastomeric components in the polyolefin components and fulfill the above requirements.

DETAILED DESCRIPTION OF THE INVENTION

The object of the invention was attained by thermoplastic elastomers of good dyeability and high strength and elasticity, the incorporated elastomeric particles of which have an average particle diameter of 0.05 to 5 μm and preferably of 0.1 to 1 μm, from propylene homopolymers and/or propylene copolymers, elastomers, unsaturated monomers, optionally thermally decomposing free radical-forming agents and adjuvants. The thermoplastic elastomers are produced by a method, in which mixtures of 20 to 80% by weight and preferably 40 to 60% by weight of propylene homopolymers and/or propylene copolymers, 80 to 20% by weight and preferably 60 to 40% by weight of elastomeric $C_4$ to $C_{12}$ olefin copolymers and/or terpolymers, 0.10 to 4.0% by weight and preferably 0.2 to 1.5% by weight, based on the sum of the polymers used, of $C_8$ to $C_{14}$ diacrylates, $C_7$ to $C_{16}$ diallyl compounds, $C_9$ to $C_{15}$ dimethacrylates, $C_7$ to $C_{10}$ divinyl compounds, $C_{12}$ to $C_{17}$ acrylate esters of polyalcohols, $C_{15}$ to $C_{21}$ methacrylate esters of polyalcohols and/or $C_9$ to to $C_{12}$ triallyl compounds, as unsaturated monomers, and 0 to 4.0% by weight and preferably 0.2 to 1.5% by weight, based on the sum of the polymers used, of acyl peroxides, alkyl peroxides, hydroperoxides, peroxycarbonates, peresters, ketone peroxides, peroxyketals and/or azo compounds, as thermally decomposing free radical-forming agents, have been reacted in a melt. Before and/or after the reaction, the addition of 0.01 to 2.5% by weight of stabilizers, 0.1 to 1% by weight of antistatic agents, 0.2 to 3% by weight of pigments, 0.05 to 1% by weight of nucleating agent, 5 to 40% by weight of fillers and/or reinforcing agents, 2 to 20% by weight of flame retardants and/or 0.01 to 1% by weight of processing aids, in each case based on the sum of the polymers used, is also possible.

The finely dispersed distribution of the elastomeric component in the polyolefin component, which is of the μm order in the case of the thermoplastic elastomers of the present invention, can be determined by photographs taken with a transmission electron microscope.

As thermally decomposing, free radical-forming agents, preferably free radical-forming agents with half life times of 20 seconds at temperatures above 150° C. are used.

Pursuant to the invention, the propylene homopolymers preferably are largely isotactic propylene homopolymers, especially isotactic propylene homopolymers, which have been produced using Ziegler-Natta catalysts or metallocene catalysts. Especially suitable for this purpose are propylene homopolymers having a bimodal molecular weight distribution, weight average molecular weights $M_w$ of 500,000 to 1,500,000 g/mole, number average molecular weights $M_n$ of 25,000 to 100,000 g/mole and $M_w/M_n$ values of 5 to 60, which were synthesized in a reactor cascade.

Likewise, for the thermoplastic elastomers, copolymers of propylene and α-olefins are preferred, having 2 or 4 to 18 carbon atoms, especially random propylene copolymers, propylene block copolymers and/or random propylene block copolymers.

Likewise, mixtures of 50 to 98% by weight of largely isotactic propylene homopolymers and/or copolymers of propylene and α-olefins having 2 or 4 to 18 carbon atoms and 2 to 50% by weight of non-isotactic propylene homopolymers, largely amorphous propylene homopolymers and/or propylene copolymers and/or non-linear, modified propylene homopolymers and/or propylene copolymers form a preferred variation of propylene homopolymers and/or propylene copolymers for the thermoplastic elastomers.

Non-isotactic propylene homopolymers, which optionally may be contained in the inventive thermoplastic elastomers, are elastomeric, high molecular weight propylene homopolymers having a melting point of 145° to 165° C., a melt viscosity of 200,000 to 2,000,000 cps at 190° C., a heat of crystallization of 4 to 10 calories/g and a solubility in diethylether of 35% to 55% by weight. Examples of these non-isotactic propylene homopolymers are the products described in the European patents 475 307 and 475 308.

The largely amorphous propylene homopolymers and/or propylene copolymers, which optionally may be contained in the thermoplastic elastomers, contain less than 10% by weight crystalline polypropylene or crystalline propylene copolymer and have an enthalpy of melting of less than 40 J/g and a melt index of 0.1 to 100 g/10 at 230° C./2.16 kg, the largely amorphous polypropylene being a homopolymer of propylene and/or a copolymer of propylene of at least 80 mole percent propylene and not more than 20 mole percent of one or more α-olefins of the general formula $CH_2=CHR$, in which R is a linear or branched alkyl group with 2 to 8 carbon atoms. These amorphous propylene homopolymers and/or propylene copolymers are, in particular, stereo block propylene homopolymers and/or propylene copolymers, which are synthesized, for example, by using highly active metal oxide-fixed Ziegler-Natta catalysts (Collette, J., Macromolecules 22 (1989), 3851–3858; DE 2830160) or soluble Ziegler-Natta catalysts (de Candia, F., Makromol. Chem. 189 (1988), 815–821), optionally with subsequent reactive modification (EP 636863) and/or degradation (EP 640 850).

The non-linear, modified propylene homopolymers and/or propylene copolymers, which optionally may be contained in the thermoplastic elastomers, have melt indexes of 0.1 to 30 g/10 at 230° C./2.16 kg and a ratio of the intrinsic viscosity of the non-linear, modified propylene homopolymer and/or propylene copolymer to the intrinsic viscosity of the linear propylene homopolymer and/or propylene copolymer having largely the same weight average molecular weight of 0.20 to 0.99. These non-linear, modified propylene homopolymers and/or propylene copolymers are synthesized by free radical coupling reactions (modification of propylene homopolymers and/or propylene copolymers with ionizing radiation or thermally decomposing free radical-forming agents, optionally with addition of multifunctional, ethylenically unsaturated monomers) and by polymer-like reactions of functionalized propylene homopolymers and/or propylene copolymers.

Examples of these non-linear, modified propylene homopolymers and/or propylene copolymers, produced by free radical coupling reactions are, in particular:

modified propylene homopolymers and/or propylene copolymers by reaction of propylene homopolymers and/or propylene copolymers with bis-maleimido compounds in the melt (EP 574 801; EP 574804), modified propylene homopolymers and/or propylene copolymers by treatment of propylene homopolymers and/or propylene copolymers with ionizing radiation in the solid phase (EP 190889; EP 634454), modified propylene homopolymers and/or propylene copolymers by treatment of propylene homopolymers and/or propylene copolymers with peroxides in the solid phase (EP 384431; DE 4340194) or in the melt (EP 142 724), modified propylene homopolymers and/or propylene copolymers by treatment of propylene homopolymers and/or propylene copolymers with multifunctional ethylenically unsaturated monomers under the action of ionizing radiation (EP 678 527), modified propylene homopolymers and/or propylene copolymers by treatment of propylene homopolymers and/or propylene copolymers with multifunctional ethylenically unsaturated monomers in the presence of peroxides in the melt (EP 688817; EP 450342).

Furthermore, as nonlinear, modified propylene homopolymers and/or propylene copolymers, which optionally may be contained in the thermoplastic elastomers of the present invention, nonlinear, modified propylene homopolymers and/or propylene copolymers, which are synthesized by the polymer-like reaction of functionalized propylene homopolymers and/or propylene copolymers, preferably of propylene homopolymers and/or propylene copolymers containing acid groups and/or acid anhydride groups, with multifunctional compounds of opposite reactivity, preferably with $C_2$ to $C_{16}$ diamines and/or with $C_2$ to $C_{16}$ diols, are preferred.

Examples of nonlinear, modified propylene homopolymers and/or propylene copolymers, produced by polymer-like reactions are, in particular:

modified propylene homopolymers and/or propylene copolymers by the reaction of maleic anhydride-grafted propylene homopolymers and/or propylene copolymers with diamines or polyglycols (EP 177401; JP 08 176 365), modified propylene homopolymers and/or propylene copolymers by the reaction of propylene homopolymers and/or propylene copolymers, containing acid or acid anhydride groups, with polymers containing epoxy, hydroxy or amino groups (EP 307684; EP 299486).

Nonlinear, modified propylene homopolymers and/or propylene copolymers, which are synthesized by the hydrolytic condensation of propylene homopolymers and/or propylene copolymers, which contain hydrolyzable silane groups, represent a further, preferred variation of nonlinear, modified propylene homopolymers and/or propylene copolymers, which may be contained in the inventive thermoplastic elastomers. The products described in German patent 4107635 or U.S. Pat. No. 4,714,716 are examples of these.

Particularly advantageously, the propylene homopolymers and/or propylene copolymers of the thermoplastic elastomers of the present invention represent a multicomponent mixture of largely isotactic propylene homopolymers and/or of copolymers of propylene and ethylene or α-olefins having 4 to 18 carbon atoms, non-isotactic propylene homopolymers, largely amorphous propylene homopolymers and/or propylene copolymers, as well as nonlinear, modified propylene homopolymers and/or propylene copolymers.

By using special multi-component mixtures of the polypropylenes and propylene copolymers described, specific combinations of properties of the thermoplastic elastomers can be achieved.

Preferably also blends of
a) 60 to 98% by weight of a crystalline copolymer of 85 to 99.5% by weight of propylene and 15 to 0.5% by weight of ethylene and/or an α-olefin of the general formula $CH_2=CHR$, in which R is a linear or branched alkyl group having 2 to 8 carbon atoms,
b) 2 to 40% by weight of an elastic copolymer of 20 to 70% by weight of ethylene and 80 to 30% by weight of propylene and/or an α-olefin of the general formula $CH_2=CHR$, wherein R is a linear or branched alkyl group having 2 to 8 carbon atoms,
   are used as propylene copolymers in the thermoplastic elastomers.

These polyolefin blends of crystalline copolymers and elastic copolymers are, for example, the polymer mixtures described in the EP 400 333 or EP 472 946.

The elastomer $C_4$ to $C_{12}$ olefin copolymers and/or terpolymers, contained in the thermoplastic elastomers of the present invention as elastomeric components, preferably are ethylene-butene copolymers, ethylene-hexene copolymers and/or ethylene-octene copolymers.

Examples of $C_8$ to $C_{14}$ diacrylates, contained in the mixtures of propylene homopolymers and/or propylene copolymers and elastomeric $C_4$ to $C_{12}$ olefin copolymers and/or terpolymers, are ethylene glycol diacrylate, propylene glycol diacrylate, trimethylene glycol diacrylate, butylene glycol diacrylate, dihydroxypentane diacrylate, dihydroxyhexane diacrylate, dihydroxyoctane diacrylate, diglycol diacrylate and triglycol diacrylate.

Examples of $C_7$ to $C_{16}$ diallyl compounds, contained in the mixtures of propylene homopolymers and/or propylene copolymers and elastomeric $C_4$ to $C_{12}$ olefin copolymers and/or terpolymers, are diallyldimethylsilane, diallyl(2-hydroxy-3-phenoxypropyl)isocyanurate, diallyl cyanurate, diallyl cyanoethyl isocyanurate, diallyl cyanamide, diallyl maleate, diallyl melamine, diallyl phthalate and/or N,N'-diallyl tartaric diamide.

Examples of the $C_9$ to $C_{15}$ dimethacrylates, contained in the mixtures of propylene homopolymers and/or propylene copolymers and elastomeric $C_4$ to $C_{12}$ olefin copolymers and/or terpolymers, are ethylene glycol dimethacrylate, propylene glycol dimethacrylate, trimethylene glycol dimethacrylate, butylene glycol dimethacrylate, dihydroxypentane dimethacrylate, dihydroxyhexane dimethacrylate, dihydroxyoctane dimethacrylate, diglycol dimethacrylate and triglycol dimethacrylate.

Examples of the $C_{12}$ to $C_{17}$ acrylate esters of polyalcohols, contained in the mixtures of propylene homopolymers and/or propylene copolymers and elastomeric $C_4$ to $C_{12}$ olefin copolymers and/or terpolymers, are trimethylolpropane triacrylate and pentaerythritol tetraacrylate.

Examples of the $C_{15}$ to $C_{21}$ methacrylate esters of polyalcohols, contained in the mixtures of propylene homopolymers and/or propylene copolymers and elastomeric $C_4$ to $C_{12}$ olefin copolymers and/or terpolymers, are glycerin trimethacrylate, trimethylolpropane trimethacrylate and pentaerythritol tetramethacrylate.

Examples of the $C_9$ to $C_{12}$ triallyl compounds, contained in the mixtures of propylene homopolymers and/or propylene copolymers and elastomeric $C_4$ to $C_{12}$ olefin copolymers and/or olefin terpolymers, are triallyl citrate, triallyl cyanurate, triallyl isocyanurate and triallyl phosphine.

For the monomers contained in the mixtures of propylene homopolymers and/or propylene copolymers and elastomeric $C_4$ to $C_{12}$ olefin copolymers and/or terpolymers, $C_7$ to $C_{10}$ divinyl compounds are especially preferred, particularly divinyl aniline, m-divinylbenzene, p-divinylbenzene, divinylpropane and/or 1,3-divinyl-1,1,3,3-tetramethyldisiloxane.

The stabilizers contained in the thermoplastic elastomers of the present invention preferably are mixtures of 0.01% to 0.6% by weight of phenolic antioxidants, 0.01% to 0.6% by weight of 3-arylbenzofuranones, 0.01% to 0.6% by weight of processing stabilizers based on phosphites, 0.01% to 0.6% by weight of high temperature stabilizers based on disulfides and thioethers and/or 0.01% to 0.8% by weight of sterically hindered amines (HALS).

Suitable phenolic anti oxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis (6-t-butyl-4-methylphenol), 4,4'-thio-bis-(6-t-butyl-2-methylphenol), octadecyl3(3,5-di-t-butyl-4-hydroxyphenyl)propionate, 1,3,5-trimethyl-2,4,6-tris(3', 5'-di-t-butyl-4-hydroxybenzyl)benzene and/or pentaerythritol-tetrakis(3-(3,5-di-t-butyl-4-hydroxyphenyl)) propionate.

As a benzofuranone derivative, 5,7-di-t-butyl-3-(3,4-dimethylphenyl)-3H-benzofuran-2-one, in particular, is suitable.

As HALS compounds, bis-2,2,6,6-tetramethyl-4-piperidyl sebacate and/or poly-((1,1,3,3-tetramethylbutyl)-imino)-1,3,5-triazine-2,4-diyl)(2,2,6,6-tetramethylpiperidyl)-amino)-hexamethylene-4-(2,2,6,6-tetramethyl)piperidyl)-imino) are particularly suitable.

The nucleating agents, optionally contained in the thermoplastic elastomers of the present invention, preferably are α-nucleating agents, such as talcum, sodium benzoate or the sodium salt of methylene-bis(2,4-di-t-butylphenol)
    phosphoric acid or β-nucleating agents, such as adipic acid, the dianilide of adipic acid, quinacridinonequinone and/or N,N'-dicyclododecyl-4,4-biphenyldicarboxamide.

The fillers, optionally contained in the thermoplastic elastomers, preferably are $Al_2O_3$, $Al(OH)_3$, barium sulfate, calcium carbonate, glass beads, wood flour, silica, hollow microspheres, carbon black, talcum and/or wollastonite.

The reinforcing agents, optionally contained in the thermoplastic elastomers, preferably are aramide fibers, cellulose fibers, flax, jute, kenaf, fiberglass, glass mats, microfibers of liquid crystalline fibers and/or polytetrafluoroethylene fibers.

Calcium stearate, magnesium stearate and/or waxes may be contained in the thermoplastic elastomers as processing aids.

Furthermore, high impact-resistant polymer blends of the present invention consist of a) 5 to 95% by weight and preferably 10 to 50% by weight of thermoplastic elastomers of the present invention and b) 95 to 5% by weight and preferably 90 to 50% by weight of b1) non-modified polyolefins, preferably of largely isotactic propylene homopolymers, copolymers of propylene and ethylene or α-olefins having 4 to 18 carbons atoms, especially random propylene copolymers, propylene block copolymers and/or random propylene block copolymers, non-isotactic propylene homopolymers, largely amorphous propylene homopolymers and/or propylene copolymers, nonlinear propylene homopolymers and/or propylene copolyrmers, and/or b2) blends of b2.1) 60 to 98% by weight of a crystalline copolymer of 85 to 99.5% by weight of propylene and 15 to 0.5% by weight of ethylene and/or an α-olefin of the general formula $CH_2=CHR$, wherein R is a linear or branched alkyl group having 2 to 8 carbon atoms and b2.2) 2 to 40% by weight of an elastic copolymer of 20 to 70% by weight of ethylene and 80 to 30% by weight of propylene and/or an α-olefin of the general formula $CH_2=CHR$, wherein R is a linear or branched alkyl group having 2 to 8 carbon atoms.

The unmodified polyolefin components in the polymer blends having high impact resistance consist preferably of those propylene homopolymers and/or propylene copolymers, which are also a component of the thermoplastic elastomers.

The thermoplastic elastomers of good dyeability and high strength and elasticity, the incorporated elastomeric particles in which have an average particle diameter of 0.05 to 5 μm and preferably of 0.1 to 1 μm, are synthesized pursuant to the invention by a method, for which mixtures of 20 to 80% by weight and preferably of 40 to 60% by weight of propylene homopolymers and/or propylene copolymers, 80 to 20% by weight and preferably 60 to 40% by weight of elastomeric $C_4$ to $C_{12}$ olefin copolymers and/or terpolymers, 0.10 to 4.0% by weight and preferably 0.2 to 1.5% by weight, based on the total of the polymers used, of $C_8$ to $C_{14}$ diacrylates, $C_7$ to $C_{16}$ diallyl compounds, $C_9$ to $C_{15}$ dimethacrylates, $C_7$ to $C_{10}$ divinyl compounds, $C_{12}$ to $C_{17}$ acrylate esters of polyalcohols, $C_{15}$ to $C_{21}$ methacrylate esters of polyalcohols and/or $C_9$ to $C_{12}$ triallyl compounds as unsaturated monomers and 0 to 4.0% by weight and preferably 0.2 to 1.5% by weight, based on the sum of the polymers used, of acyl peroxides, alkyl peroxides, hydroperoxides, peroxycarbonates, peresters, ketone peroxides, peroxyketals and/or azo compounds as thermally decomposing free-radical forming agents are reacted in continuous kneaders in the melt at mass temperatures of 150° C. to 300° C. and preferably of 185° C. to 245° C. and residence times of 1 to 35 minutes and preferably of 2.5 to 6 minutes. 0.01 to 2.5% by weight of stabilizers, 0.1 to 1% by weight of antistatic agents, 0.2 to 3% by weight of pigments and 0.5 to 1% by weight of nucleating agents, 5 to 40% by weight of fillers and/or reinforcing materials, 2 to 20% by weight of flame retardants and/or 0.01 to 1% by weight of processing aids, in each case based on the sum of the polymers used, can be added before and/or after the reaction as additives.

As thermally decomposing free radical-forming agents for the method of preparing the thermoplastic elastomers, acyl peroxides, alkyl peroxides, hydroperoxides, peroxycarbonates, peresters, ketone peroxides, peroxyketals and/or azo compounds are used.

Examples of the acyl peroxides used are benzoyl peroxide, chlorobenzoyl peroxide, methoxybenzoyl peroxide, methylbenzoyl peroxide, nitrobenzoyl peroxide, acetylbenzoyl peroxide, lauroyl peroxide or succinoyl peroxide.

Examples of the alkyl peroxides used are allyl-t-butyl peroxide, 2,2-bis-(t-butylperoxybutane), 1,1-bis-(t-butylperoxy)-3,3,5-trimethylcyclohexane, diisopropyl-aminomethyl-t-amyl peroxide, dimethylaminomethyl-t-amyl peroxide, diethylanmino-methyl-t-butyl peroxide, dimethylaminomethyl-t-butyl peroxide, 1,1-di(t-amylperoxy)cyclohexane, t-amyl peroxide, t-butylcumyl peroxide, t-butyl peroxide and/or 1-hydroxybutyl-n-butyl peroxide.

Examples of hydroperoxides used are decalin hydroperoxide and tetralin hydroperoxide.

Examples of peresters and peroxy carbonates used are butyl peracetate, cumyl peracetate, cumyl perpropionate, cyclohexyl peracetate, di-t-butyl peradipate, di-t-butyl perazelate, di-t-butyl perglutarate, di-t-butyl perphthalate, di-t-butyl persebacate, 4-nitrocumyl perpropionate, 1-phenylethyl perbenzoate, phenylethyl nitroperbenzoate, t-butyl-bicyclo-(2,2,1)-heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2, 2-diphenylvinyl)perbenzoate, t-butyl-4-methoxy perbenzoate, t-butyl perbenzoate, t-butylcarboxycyclohexane, t-butyl pernaphthoate, t-butyl peroxyisopropyl carbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succinimido percarboxylate, t-butyl percrotonoate, t-butyl permaleate, t-butyl permethacrylate, t-butyl peroctoate, t-butyl peroxyisopropylcarbonate, t-butyl perisobutyrate, t-butyl peracrylate and t-butyl perpropionate.

Examples of ketone peroxides used are methyl ethyl ketone hydroperoxide and diethyl ketone hydroperoxide.

Examples of peroxyketals used are 1,1-di-t-butylperoxy-3,3,5-trimethylcyclohexane and 1,1-di-t-butylperoxy-3,3,5-dimethylethylcyclohexane.

Examples of azo compounds used are 2-cyano-2-propylazoformamide, 2,2'-azo-bis-2-methylpropionitrile, 1,1'-azo-bis-cyclopentane nitrile, 1,1'-azo-bis-cyclohexane nitrile, 2,2'-azo-bis-cyclohexyl propionitrile, 2,2'-azo-bis-methyl-2-methyl propionate and azo-bis-(N,N'-diethyleneisobutyramidine).

Twin-screw extruders, single-screw extruders of high mixing action or a cascade of coupled kneading chambers are suitable as continuous kneaders for the method of producing the thermoplastic elastomers.

In a preferred variation of the metered addition of the $C_8$ to $C_{14}$ diacrylates, $C_7$ to $C_{16}$ diallyl compounds, $C_9$ to $C_{15}$ dimethacrylates, $C_7$ to $C_{10}$ divinyl compounds, $C_{12}$ to $C_{17}$ acrylate esters of polyalcohols, $C_{15}$ to $C_{21}$ methacrylate esters of polyalcohols and/or $C_9$ to $C_{12}$ triallyl compounds as unsaturated monomers and/or acyl peroxides, alkyl peroxides, hydroperoxides, peroxycarbonates, peresters, ketone peroxides, peroxyketals and/or azo compounds as thermally decomposing free radical-forming agents, the metered addition takes place in the continuous kneaders in the melt of the mixture of propylene homopolymers and/or propylene copolymers, elastomeric $C_4$ to $C_{12}$ olefin copolymers and/or terpolymers and optionally auxiliary materials, $C_8$ to $C_{14}$ diacrylates, $C_7$ to $C_{16}$ diallyl compounds, $C_9$ to $C_{15}$ dimethacrylates, $C_7$ to $C_{10}$ divinyl compounds, $C_{12}$ to $C_{17}$ acrylate esters of polyalcohols, $C_{15}$ to $C_{21}$ methacrylate esters of polyalcohols and/or $C_9$ to $C_{12}$ triallyl compounds as unsaturated monomers and/or acyl peroxides, alkyl peroxides, hydroperoxides, peroxycarbonates, peresters, ketone peroxides, peroxyketals and/or azo compounds as thermally decomposing free radical-forming agents.

In a further preferred variation of the method of preparing thermoplastic elastomers, the mixing of the propylene homopolymers and/or propylene copolymers, elastomeric $C_4$ to $C_{12}$ olefin copolymers and/or terpolymers and optionally additives with the $C_8$ to $C_{14}$ diacrylates, $C_7$ to $C_{16}$ diallyl compounds, $C_9$ to $C_{15}$ dimethacrylates, $C_7$ to $C_{10}$ divinyl compounds, $C_{12}$ to $C_{17}$ acrylate esters of polyalcohols, $C_{15}$ to $C_{21}$ methacrylate esters of polyalcohols and/or $C_9$ to $C_{12}$ triallyl compounds as unsaturated monomers and/or acyl peroxides, alkyl peroxides, hydroperoxides, peroxycarbonates, peresters, ketone peroxides, peroxyketals and/or azo compounds as thermally decomposing free radical-forming agents takes place by premixing before the metered addition of the mixtures into the continuous kneader.

For the premixing or absorption of the thermally decomposing free radical-forming agents, acyl peroxides, alkyl peroxides, hydroperoxides, peroxycarbonates, peresters, ketone peroxides, peroxyketals and/or azo compounds are used which have a half life of more than 40 seconds at the melting point or softening point of the propylene homopolymers and/or propylene copolymers used, in order to preclude premature decomposition before the homogenization of the mixture.

The thermoplastic elastomers of the present invention, as well as mixtures of thermoplastic elastomers with conventional polyolefins are suitable preferably for use in the vehicle industry, especially for hose connectors, air intake ducts, pipe seals and sealing profiles, in the household appliances industry, especially for connectors and sealing profiles, in the building construction industry, especially for window seals, sealing profiles for partitions, expansion joints, as well as in medical technology, particularly for tubes, seals, syringes and pistons.

It is of particular advantage that, because of their opaque coloration, the thermoplastic elastomers can be dyed to any color shade for the manufacture of colored products.

The invention is further described in the following Examples.

EXAMPLE 1

Into a Werner-Pfleiderer ZSK 54 twin-screw extruder, with an L/D of 36, 2 scales for the metered addition, equipment for the metered addition of liquid media to zone 4, vacuum degassing and underwater granulation, a temperature profile of 85°/175°/220°/185°/220°/225°/210°/190° C., a propylene-ethylene copolymer (with an ethylene content of 3.9% by weight and a melt index of 7.2 g/10 min at 230° C./2.16 kg) is added at the rate of 8.0 kg/hour and an ethylene-octene copolymer (with an octene content of 22% by weight and a melt index of 4.5 g/10 min at 190° C./2.16 kg) is added at the rate of 12.0 kg/hour. The mixture is melted in the extruder and a mixture of 30% by weight of p-divinylbenzene, 16% by weight of 2,5-dimethyl-2,5-di(t-butylperoxyhexane) and 54% by weight of acetone is added at the rate of 0.60 kg/hour to zone 4 of the extruder. The reaction mixture is subjected to a vacuum degassing, discharged and granulated.

The resulting, opaque, thermoplastic elastomer has the following properties:

tensile stress (N/mm$^2$) at an elongation (%): 7.2/200, 9/400, 13.0/600 tensile strain: 23%

EXAMPLE 2

Into the Werner-Pfleiderer twin-screw extruder of Example 1, a propylene-ethylene copolymer of Example 1 and an ethylene-octene copolymer of Example 1 are added each at the rate of 10.0 kg/hour. The mixture is melted in the extruder and a mixture of 36% by weight of butylene glycol diacrylate, 8% by weight of dicumyl peroxide and 56% by weight of acetone is added at the rate of 0.62 kg/hour to zone 4 of the extruder. The reaction mixture is subjected to a vacuum degassing, discharged and granulated.

The resulting, opaque, thermoplastic elastomer has the following properties:

tensile stress (N/mm$^2$) at an elongation (%): 8.0/200, 10.0/400, 15.2/600 tensile strain: 28%

For comparison, the thermoplastic elastomer, produced under the same conditions without the addition of the mixture of butylene glycol diacrylate, dicumyl peroxide and acetone, has a tensile strength of 8.8 N/mm$^2$ at an elongation at break of 43%.

A thermoplastic elastomer, produced under the same experimental conditions without the addition of butylene glycol diacrylate, has the following properties:

tensile stress (N/mm$^2$) at an elongation (%): 7.2/200, 8.0/400, 10.6/600 tensile strain: 30%.

EXAMPLE 3

To the Werner & Pfleiderer twin-screw extruder of Example 1, having a temperature profile of 80°/170°/230°//190°/230°/230°/220°/190° C., a polyolefin mixture, which consists of 40% by weight of a reactor blend (with an ethylene content of 33 mole percent, a melt index of 8 g/10 min at 230° C./2.16 kg), consisting of a crystalline propylene-ethylene copolymer and an elastic ethylene-propylene copolymer, and 60% by weight of an ethylene-octene copolymer of example 1, onto which 0.45% by weight m-divinylbenzene, 0.25% by weight of 1-phenylethyl perbenzoate, 0.20% by weight of dicumyl peroxide, 0.30% by weight of t-butyl-4,6-diisopropylphenol, 0.15% by weight of bis-2,2,6,6-tetramethyl-4-piperidyl sebacate and 0.2% by weight of calcium palmitate, in each case based on the polyolefin mixture used, were drummed in the kneader, was added at the rate of 20.5 kg/hour. The mixture was melted in the extruder, reactively compounded, subjected to a vacuum degassing, discharged and granulated.

The resulting opaque, thermoplastic elastomer bag the following properties:

tensile stress (N/mm$^2$) at an elongation (%): 6.6/200, 8.9/400, 12.7/600 tensile strain: 16.5%

For comparison, the thermoplastic elastomer, prepared under the same conditions without the addition of m-divinylbenzene and thermally decomposing free radical-forming agents, has the following properties:

tensile stress (N/mm$^2$) at an elongation (%): 2.8/200, 3.0/400, 3.6/600 tensile strain: 23.8%

A thermoplastic elastomer, produced under the same experimental conditions without the addition of m-divinylbenzene, has the following properties:

tensile stress (N/mm$^2$) at an elongation (%): 5.0/200, 6.5/400, 7.7/600 tensile strain: 21.2%

EXAMPLE 4

To the Werner & Pfleiderer twin-screw extruder of Example 1, a polyolefin mixture of 35% by weight of the reactor blend of Example 3, 5% by weight of a nonlinear, modified propylene homopolymer (with a melt index of 1.4 g/10 min at 230° C./2.16 kg, a bound butadiene content of 0.5% by weight, a ratio of the intrinsic viscosity of the nonlinear modified propylene homopolymer to that of the unmodified propylene homopolymer of 0.78) and 60% by weight of the ethyleneoctene copolymer of Example 1, onto which 0.35% by weight of diallyl maleate, 0.25% by weight of t-butyl pertoluate, 0.20% by weight of t-butylcumyl peroxide, 0.15% by weight of 2-t-butyl-4,6-diisopropylphenol, 0.15% by weight of bis-2,2,6,6-tetramethyl-4-piperidyl sebacate and 0.2% by weight of calcium palmitate, in each case based on the polyolefin mixture used, were drummed in the kneader, was added at the rate of 22 kg/hour. The mixture was melted in the extruder, compounded reactively, subjected to a vacuum degassing, discharged and granulated.

The resulting opaque, thermoplastic elastomer has the following properties:

tensile stress (N/mm$^2$) at an elongation (%): 6.7/200, 8.2/400, 11.0/600 tensile strain: 15.45%

For comparison, the thermoplastic elastomer, prepared under the same conditions without the addition of the diallyl maleate and thermally decomposing free radical-forming agents, has the following properties:

tensile stress (N/mm$^2$) at an elongation (%): 3.2/200, 3.4/400, 3.6/600 tensile strain: 23.5%

A thermoplastic elastomer, produced under the same experimental conditions without the addition of diallyl maleate, has the following properties:

tensile stress (N/mm$^2$) at an elongation (%): 4.6/200, 5.8/400, 6.7/600 tensile strain: 22.1%

EXAMPLE 5

To a Berstorff Z25 twin-screw extruder, a polymer mixture of 70% by weight of polypropylene homopolymer (with a melt index of 1.9 g/10 min at 230° C./2.16 kg) and 30% by weight of the thermoplastic elastomer of Example 2 is melted, homogenized and discharged at 250 rpm, a throughput of 5 kg/hour and a temperature profile of 25°/215°/215°/215°/215°/215°/215°/220° C. and then granulated.

The resulting impact-resistant, modified polypropylene has the following properties:

tensile stress (N/mm$^2$) at an elongation (%): 20.2/200, 21.0/400, 22.3/600 notched impact strength of Charpy (kJ/m$^2$) at (°C.): 41/20, 4.7/−20, 2.3/−40

For comparison, an impact-resistant, modified polypropylene, which was produced under the same homogenizing conditions from 70% by weight of the polypropylene homopolymer and 30% by weight of the corresponding, unmodified propylene polymer/elastomer mixture of Example 2, has the following properties:

tensile stress (N/mm$^2$) at an elongation (%): 19.4/200, 20.0/400, 22.7/600 notched impact strength of Charpy (kJ/m$^2$) at (°C.): 10.6/20, 3.2/−20, 2.0/−40.

What is claimed is:

1. Thermoplastic elastomers comprising products of the reaction of:
    a) 20 to 80% by weight of propylene homopolymers and/or propylene copolymers;
    b) 80 to 20% by weight of elastomeric $C_4$ to $C_{12}$ olefin copolymers and/or terpolymers;
    c) 0.10 to 4.0% by weight, based on the total of the polymers used, of unsaturated monomers from the group consisting of $C_8$ to $C_{14}$ diacrylates, $C_7$ to $C_{16}$ diallyl compounds, $C_9$ to $C_{15}$ dimethacrylates, $C_7$ to $C_{10}$ divinyl compounds, $C_{12}$ to $C_{17}$ acrylate esters of polyalcohols, $C_{15}$ to $C_{21}$ methacrylate esters of polyalcohols and $C_9$ to $C_{12}$ triallyl compounds; and
    d) 0.2 to 4.0% by weight based on the total of the polymers used, of thermally decomposing free radical-forming agents from the group consisting of acyl peroxides, alkyl peroxides, hydroperoxides, peroxycarbonates, peresters, ketone peroxides, peroxyketals and azo compounds,
    wherein said thermoplastic elastomers include elastomeric particles having an average particle diameter of 0.05 to 5 μm, and
    said reaction comprising reacting the propylene homopolymers and/or propylene copolymers, the elastomeric $C_4$ to $C_{12}$ olefin copolymers and/or terpolymers, the unsaturated monomers and the thermally decomposing free radical-forming agents in a melt.

2. The thermoplastic elastomers of claim 1, wherein the propylene homopolymers and/or propylene copolymers are
    a) largely isotactic propylene homopolymers synthesized by Ziegler-Natta catalysts or metallocene catalysts, or
    b) copolymers of propylene and ethylene or α-olefins having 4 to 18 carbon atoms, random propylene copolymers, propylene block copolymers and/or random propylene block copolymers, or
    c) mixture s of 50 to 98% by weight of the polymers a) and/or b) and 2 to 50% by weight of:
    c1) non-isotactic propylene homopolymers having a melting point of 145° to 165° C., a melt viscosity of 200,000 to 2,000,000 cps at 190° C., a heat of crystallization of 4 to 10 calories/g and a 35 to 55% by weight solubility in diethylether,
    c2) largely amorphous propylene homopolymers or propylene copolymers, which contain less than 10% by weight of crystalline propylene homopolymers or crystalline propylene copolymers, have an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole percent of propylene and not more than 20 mole percent of one or more α-olefins of the formula $CH_2=CHR$, in which R is a linear or branched alkyl group having 2 to 8 carbon atoms, and/or
    c3) nonlinear, modified, propylene homopolymers and/or propylene copolymers, having melt indexes of 0.1 to 30 g/10 min at 230° C./2.16 kg and a ratio of the intrinsic viscosity of the nonlinear, modified propylene homopolymer and/or propylene copolymer to the intrinsic viscosity of linear propylene homopolymer and/or propylene copolymer having substantially the same weight average molecular weight of 0.20 to 0.99, or d) mixtures of polymers a), b) and c).

3. The thermoplastic elastomers of claim 1, wherein the propylene copolymers consist of a blend of:
   a) 60 to 98% by weight of a crystalline copolymer of 85 to 99.5% by weight of propylene and 15 to 0.5% by weight of ethylene and/or an α-olefin of a formula $CH_2=CHR$, in which R is a linear or branched alkyl group having 2 to 8 carbon atoms, and
   b) 2 to 40% by weight of an elastic copolymer of 20 to 70% by weight of ethylene and 80 to 30% by weight of propylene and/or an α-olefin of a formula $CH_2=CHR$, wherein R is a linear or branched alkyl group having 2 to 8 carbon atoms.

4. The thermoplastic elastomers of claims 1, 2 or 3, wherein the elastomeric $C_4$ to $C_{12}$ olefin copolymers and/or terpolymers are ethylene-butene copolymers, ethylene-hexene copolymers and/or ethylene-octene copolymers.

5. The thermoplastic elastomers of claim 1, wherein the unsaturated monomers comprise $C_7$ to $C_{10}$ divinyl compounds selected from the group consisting of divinyl aniline, m-divinylbenzene, p-divinylbenzene, divinylpropane and 1,3-divinyl-1,1,3,3-tetramethyldisiloxane.

6. High impact-resistant polymer blends comprising:
   a) 5 to 95% by weight of thermoplastic elastomers of claim 1 and
   b) 95 to 5% by weight of:
     b1) non-modified polyolefins of largely isotactic propylene homopolymers, copolymers of propylene and ethylene or α-olefins having 4 to 18 carbons atoms, random propylene copolymers, propylene block copolymers and/or random propylene block copolymers, non-isotactic propylene homopolymers, largely amorphous polypropylenes, nonlinear propylene polymers, and/or
     b2) blends of
     b2.1) 60 to 98% by weight of a crystalline copolymer of 85 to 99.5% by weight of propylene and 15 to 0.5% by weight of ethylene and/or an α-olefin of a formula $CH_2=CHR$, wherein R is a linear or branched alkyl group having 2 to 8 carbon atoms, and
     b2.2) 2 to 40% by weight of an elastic copolymer of 20 to 70% by weight of ethylene and 80 to 30% by weight of propylene and/or an α-olefin of a formula $CH_2=CHR$, wherein R is a linear or branched alkyl group having 2 to 8 carbon atoms.

7. A method for the preparation of thermoplastic elastomers comprising the steps of:
   a) providing 20 to 80% by weight of propylene homopolymers and/or propylene copolymers;
   b) providing 80 to 20% by weight of elastomeric $C_4$ to $C_{12}$ olefin copolymers and/or terpolymers;
   c) providing 0.10 to 4.0% by weight, based on the total of the polymers used, of unsaturated monomers from the group consisting of $C_8$ to $C_{14}$ diacrylates, $C_7$ to $C_{16}$ diallyl compounds, $C_9$ to $C_{15}$ dimethacrylates, $C_7$ to $C_{10}$ divinyl compounds, $C_{12}$ to $C_{17}$ acrylate esters of polyalcohols, $C_{15}$ to $C_{21}$ methacrylate esters of polyalcohols and/or $C_9$ to $C_{12}$ triallyl compounds;
   d) providing thermally decomposing free radical-forming agents 0.4 to 4% by weight, based on the sum of the polymers used, of acyl peroxides, alkyl peroxides, hydroperoxides, peroxycarbonates, peresters, ketone peroxides, peroxyketals and/or azo compounds; and
   e) reacting components a), b),c) and d) in a continuous kneader in a melt at mass temperatures of 150° to 300° C. and at residence times of 1 min to 35 min to form elastomeric particles in the thermoplastic elastomer having an average particle diameter of 0.05 to 5 μm.

8. The method for preparing thermoplastic elastomers of claim 7, wherein the unsaturated monomers are added directly into the melt of the thermally decomposing free radical-forming agents, the propylene homopolymers and/or propylene copolymers, and the elastomeric $C_4$ to $C_{12}$ olefin copolymers and/or terpolymers.

9. The method for preparing thermoplastic elastomers of claim 7, wherein the propylene homopolymers and/or propylene copolymers, the elastomeric $C_4$ to $C_{12}$ olefin copolymers and/or terpolymers and unsaturated monomers, and/or thermally decomposing free radical-forming agents are premixed before being reacted in the continuous kneader.

10. Hose connectors, air intake ducts, pipe seals and or sealing profiles comprising the thermoplastic elastomer of claim 1.

11. The thermoplastic elastomers of claim 1 further comprising 0.01 to 2.5% by weight of stabilizers, 0.1 to 1% by weight of antistatic agents, 0.2 to 3% by weight of pigments, 0.05 to 1% by weight of nucleating agents, 5 to 40% by weight of fillers and/or reinforcing materials, 2 to 20% by weight of flame retardants and/or 0.01 to 1% by weight of processing aids,
   wherein:
   a) the propylene homopolymers and/or propylene copolymers are provided in an amount of 40 to 60% by weight,
   b) the elastomeric $C_4$ to $C_{12}$ olefin copolymers and/or terpolymers are provided in an amount of 60 to 40% by weight,
   c) the unsaturated monomers are provided in an amount of 0.2 to 1.5% by weight,
   d) the thermally decomposing free radical-forming agents are provided in an amount of 0.2 to 1.5% by weight based on the total of the polymers used, and
   e) the elastomeric particles have an average particle diameter of 0.1 to 1 μm.

12. The high impact-resistant polymer blends according to claim 6 wherein component a) is provided in an amount of 10 to 50% by weight of thermoplastic elastomers of claim 1 and component b) is provided in an amount of 90 to 50% by weight.

13. The method for making thermoplastic elastomers according to claim 7 further comprising the step of:
   adding 0.01 to 2.5% by weight of stabilizer, 0.1 to 1% by weight of antistatic agents, 0.2 to 3% by weight of pigments, 0.05 to 1% by weight of nucleating agent, 5 to 40% by weight of fillers and/or reinforcing agents, 2 to 20% by weight of flame retardants and/or 0.01 to 1% by weight of processing aids,
   wherein:
   a) the propylene homopolymers and/or propylene copolymers are provided in an amount of 40 to 60% by weight;
   b) the elastomeric $C_4$ to $C_{12}$ olefin copolymers and/or terpolymers are provided in an amount of 60 to 40% by weight;
   c) the unsaturated monomers are provided in an amount of 0.2 to 1.5% by weight;
   d) the thermally decomposing free radical-forming agents are provided in an amount of 0.2 to 1.5% by weight;
   e) the reacting step is performed at mass temperatures of 185° to 245° C. and at residence times of 2.5 min to 6 min, and
   f) the elastomeric particles have an average particle diameter of 0.1 to 1 μm.

* * * * *